United States Patent [19]

Kawachi

[11] 4,307,427

[45] Dec. 22, 1981

[54] PAD ABUTTING DEVICE FOR A MAGNETIC HEAD OF A DUAL CAPSTAN TYPE CASSETTE TAPE RECORDER

[75] Inventor: Hideo Kawachi, Ichikawa, Japan

[73] Assignee: Nakamichi Corporation, Tokyo, Japan

[21] Appl. No.: 113,386

[22] Filed: Jan. 18, 1980

[30] Foreign Application Priority Data

Jan. 18, 1979 [JP] Japan ............................ 54-40802[U]

[51] Int. Cl.$^3$ .......................... G11B 15/60; G11B 5/22
[52] U.S. Cl. ................................ 360/128; 360/130.21; 360/130.31
[58] Field of Search ... 360/128, 130.21, 130.31–130.33

[56] References Cited

U.S. PATENT DOCUMENTS 3,777,070  12/1973  Bumb ............................ 360/130.33

Primary Examiner—Robert S. Tupper
Attorney, Agent, or Firm—Pearne, Gordon, Sessions, McCoy & Granger

[57] ABSTRACT

This invention relates to a pad abutting device for a magnetic head of a dual capstan type cassette tape recorder. This pad abutting device comprises a pair of upper and lower abutting members mounted on a front face of a magnetic head which is to be extended through an opening of a cassette having a pad provided therein, the abutting members being disposed apart by a distance less than the width of the pad, but greater than the width of a magnetic tape in the cassette. When the cassette is placed in the tape recorder so that the magnetic head enters the opening of the cassette, the abutting members abut against the pad at its upper and lower edges whereby the pad is prevented from resiliently pressing the magnetic tape against the magnetic head. Each of the pad abutting members comprises a spacer provided integrally with the body of the respective pad abutting member, disposed between the body of the pad abutting member and the front face of the magnetic head so as to abut against the latter, the spacers of the abutting members having a thickness greater than that of the magnetic tape, respectively and being disposed apart by a distance substantially greater than the space between the upper and lower abutting members.

10 Claims, 9 Drawing Figures

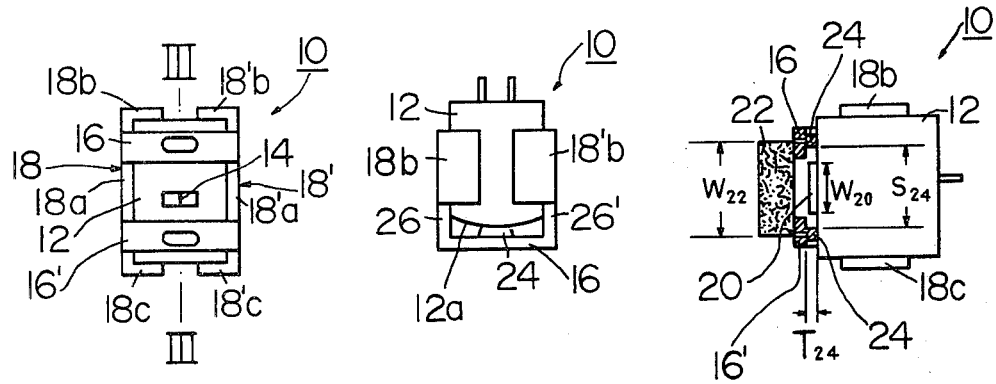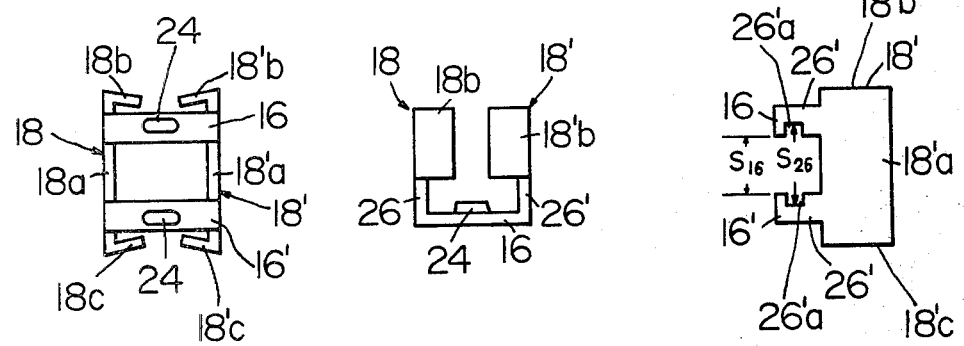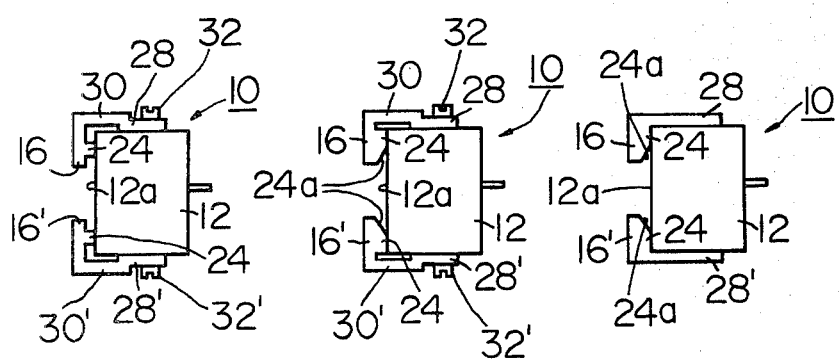

PAD ABUTTING DEVICE FOR A MAGNETIC HEAD OF A DUAL CAPSTAN TYPE CASSETTE TAPE RECORDER

BACKGROUND OF THE INVENTION

In a single capstan type cassette tape recorder in which a magnetic tape is held between a single capstan and a pinch roller to be fed, the magnetic tape is controlled in its travelling position by a tape guide provided on a side wall of a magnetic head and is in good contact with the magnetic head by means of the pad provided in the cassette to resiliently urge the magnetic tape against the magnetic head.

However, in a dual capstan type cassette tape recorder in which the magnetic tape is held between two capstans and two pinch rollers facing these capstans, respectively, that portion of the magnetic tape positioned between the two sets of a capstan and a pinch roller has a tension and a travelling position provided thereto. Therefore, if the magnetic tape is resiliently urged against the magnetic head by the pad in the cassette, then a back tension of the magnetic tape portion provided by the two sets of capstans and pinch rollers cannot be effectively provided, and the travelling position of the magnetic tape cannot be maintained at the front face of the magnetic head because the pad tends to urge the magnetic tape in an unstable manner. Also, a tape guide positioned between the capstans tends to damage the magnetic tape due the displacement of the tape guide.

In general, in case a cassette is used in a digital tape recorder, with a pad in the cassette being composed of felt or the like, an unstable tension tends to be disadvantageously applied to the magnetic tape because the pad of felt tends to be affected by temperature and moisture. U.S. Pat. No. 3,777,070 discloses the provision of pad spacer means on a magnetic head for keeping the pad spaced from the magnetic head. This avoids the aforementioned drawback. In this U.S. patent, upper and lower sections of the spacer means are disposed apart by a distance generally equal to a width of a magnetic tape and have respective shoulders provided to engage the edges of the magnetic tape so as to guide it. However, if such pad spacer means are used in a dual capstan type cassette tape recorder, it is quite difficult to make a travelling position of the magnetic tape coincident with a tape guide position provided by the shoulders of the spacer means. If the tape travelling position is even slightly displaced relative to the tape guide position, the magnetic tape will be damaged by being forcefully guided. Thus, it will be noted that it is not proper to use the spacer means of U.S. Pat. No. 3,777,070 in a dual capstan type tape recorder.

On the basis of the aforementioned prior art, it will be easily understood that the abutting members are provided merely with a recess positioned adjacent to the front face of the magnetic head in order to avoid damage to the magnetic tape due to engagement of the abutting members with the magnetic tape. However, the distance between the abutting faces of the abutting members and the front face of the magnetic head is difficult to determined with precision, and in case that the abutting members are formed of resilient metal plate, the abutting members tend to be deformed due to their abutment against the pad and an external force applied thereto. This causes the magnetic tape to be damaged because the abutting members contact the upper or lower edge of the magnetic tape.

SUMMARY OF THE INVENTION

Accordingly, it is a principal object of the invention to provide a pad abutting device for a magnetic head of a dual capstan type cassette tape recorder in which a back tension can be effectively applied to a magnetic tape.

It is another object of the invention to provide a pad abutting device for a magnetic head of a dual capstan type cassette tape recorder in which a travelling position of a magnetic tape can be maintained at a front face of a magnetic head in a stable manner.

It is another object of the invention to provide a pad abutting device for a magnetic head of a dual capstan type cassette tape recorder in which a magnetic tape is prevented from damage.

In accordance with the invention, there is provided a pad abutting device for a magnetic head of a dual capstan type cassette tape recorder comprising a pair of upper and lower abutting members mounted on a front face of a magnetic head which is to be extended through an opening of a cassette having a pad provided therein, said abutting members being disposed apart by a distance less than the width of the pad and greater than the width of a magnetic tape in the cassette whereby the pad is prevented from resiliently pressing the magnetic tape against the front face of said magnetic head when said magnetic head is introduced into the cassette, each of said abutting members characterized by comprising a spacer provided integrally therewith and disposed between the body of the corresponding abutting member and the front face of said magnetic head so that said spacer abuts against the front face of said magnetic head, and said spacers of said abutting members having a thickness greater than that of the magnetic tape and being disposed apart by a distance substantially greater than the space between said upper and lower abutting members.

BRIEF DESCRIPTION OF THE DRAWING

The above and other objects and features of the invention will be apparent from the description of the embodiments of the invention taken with reference to the accompanying drawing in which;

FIGS. 1 and 2 are front and plan views of a pad abutting device constructed in accordance with the invention;

FIG. 3 is a cross sectional view of the pad abutting device taken along the line III—III of FIG. 1;

FIGS. 4 to 6 are front, plan and side elevational views, respectively, of a pair of upper and lower abutting members integrally formed with each other and used for the pad abutting device of FIGS. 1 to 3; and FIGS. 7 to 9 are side elevational views of some modifications of the pad abutting device of the invention.

DETAILED DESCRIPTION OF THE EMBODIMENTS

Referring now to FIGS. 1 to 3, there is shown a pad abutting device 10 for a magnetic head 12 of a dual capstan type cassette tape recorder. The magnetic head 12 has a magnetic gap 14 provided at the front face 12a thereof.

The pad abutting device 10 comprises a pair of upper and lower abutting members 16 and 16' formed in a generally U-shaped manner as viewed in FIGS. 2 and 5.

In the embodiment of these figures, the pair of abutting members 16 and 16' are provided integrally with a common pair of right and left mounting bases 18 and 18' so as to be a single component. As shown in the figures, the mounting bases 18 and 18' comprise side walls 18a and 18'a, upper walls 18b and 18'b and lower walls 18c and 18'c which are integrally formed with each other. The upper and lower walls 18b, 18'b, 18c and 18'c are bent from the side walls 18a and 18'a at an acute angle. The mounting bases 18 and 18' are mounted on the magnetic head with the upper and lower walls 18b, 18'b, 18c and 18'c resiliently engaged with the upper and lower faces of the magnetic head 12.

A not shown cassette which has a magnetic tape 20 contained therein comprises a pad 22 disposed behind the magnetic tape 20 as shown in FIG. 3, and exposed to an opening (not shown) in the cassette. When the cassette is introduced into tape recorder, the magnetic head 12 together with the pad abutting device 10 relatively passes through the opening in the cassette. At that time, the pad abutting device 10 abuts against the pad 22 in the cassette, as shown in FIG. 3.

As shown in FIGS. 1 to 6, the pair of abutting members 16 and 16' extend integrally from the edges of the side walls 18a and 18'a of the mounting bases 18 and 18'. The abutting members 16 and 16' are spaced apart by the distance or space $S_{16}$ which is less than the width $W_{22}$ of the pad 22 but greater than the width $W_{20}$ of the magnetic tape 20. Thus, it will be noted that when the magnetic head is introduced into the cassette, the abutting members 16 and 16' abut against the upper and lower edges of the pad 22. It will be noted also that the magnetic tape 20 can pass through the space between the abutting members 16 and 16'.

Each of the abutting members 16 and 16' comprises a spacer 24 provided at the center thereof integrally with the body of each of the abutting members 16 and 16'. The spacer 24 is disposed between the body of each of the abutting members 16 and 16' and the front face 12a of the magnetic head 12 so that it abuts against the front face 12a of the magnetic head 12. As shown in FIG. 3, the spacer 24 has a thickness $T_{24}$ greater than the thickness of the magnetic tape 20. As also shown in FIG. 3, the spacers 24 and 24 of the abutting members 16 and 16' are disposed apart by a distance $S_{24}$ substantially greater than the width $W_{20}$ of the magnetic tape 20.

Each of the abutting members 16 and 16' has a pair of legs 26 and 26' connecting the abutting members 16 and 16' with the mounting bases 18 and 18'. As noted from FIGS. 3 and 6, the legs 26 and 26' have a length substantially greater than the thickness of the spacers 24 and may be preferably provided with notches 26a and 26'a, respectively, which have the space $S_{26}$ provided between one and another and greater than the space $S_{16}$ between the abutting members 16 and 16'. Thus, it will be noted that the magnetic tape 20 is never damaged due to its engagement with the edges of the spacers 24 and 24 and/or the legs 26 and 26'.

In the embodiment of FIGS. 1 to 6, the pad abutting device 10 may be preferably made of resilient metal plate shaped by a press. In this case, the spacers 24 of the abutting members 16 and 16' may be formed by deforming metal materials of the abutting members 16 and 16' as shown in FIGS. 1 and 3.

In the cassette tape recorder having the pad abutting device 10 mounted on the magnetic head 12, when the cassette is introduced into the tape recorder, the magnetic head 12 is relatively inserted into the opening in the cassette at its front face so that the upper and lower abutting members 16 and 16' abut against the upper and lower edges of the pad 22 as shown in FIG. 3. It will be noted that, at that time, the pad 22 never presses the magnetic tape 20 against the magnetic head 12 as shown in FIG. 3. It will be noted also that the magnetic tape 20 is never prevented from its normal travel by means of a dual capstan type driving system because the traveling position of the magnetic tape 20 is not forced by the abutting members 16 and 16'. It should be understood that since each spacer 24 is disposed between the corresponding abutting member 16 and 16' and the front face 12a of the magnetic head 12, the abutting members 16 and 16' are never deformed when they abut against the pad 22, and they are spaced apart by a constant distance from the front face 12a of the magnetic head 12.

FIGS. 7 to 9 show three modifications of the pad abutting device 10 in which the abutting members 16 and 16' are provided separately from each other and integrally with respective upper and lower mounting bases 28 and 28'. In FIGS. 7 and 8, numerals 30 and 30' designate portions of the abutting members 16 and 16' which connect the abutting members 16 and 16' with the respective mounting bases 28 and 28'. In the modifications of FIGS. 7 and 8, the mounting bases 28 and 28' are securely mounted on the upper and lower faces of the magnetic head 12 by means of respective screws 32 and 32', but in the modification of FIG. 9, they are bonded by adhesives to the upper and lower faces of the magnetic head 12. It will be understood that the pad abutting device 10 of FIGS. 7 to 9 are not required to have means such as the notches 26a and 26'a as shown in FIG. 6 to prevent the upper and lower edges of the magnetic tape 12 from having contact with the connecting portions 30 and 30' because they are disposed over or on the upper face of the magnetic head 12 and below or on the lower face of the magnetic head 12, respectively. In FIG. 7, the spacers 24 of the abutting members 16 and 16' are formed by deforming metal materials of the abutting members 16 and 16' in the same manner as described in the embodiment of FIGS. 1 to 6. In FIGS. 8 and 9, the spacers 24 of the abutting members 16 and 16' are made by forming inclined faces 24a at the back faces of the abutting members 16 and 16'. The distance between the inclined faces 24a of the upper and lower spacers 24 becomes larger as they approach the front face 12a of the magnetic head 12. Thus, it will be understood that the magnetic tape, not shown in these figures, is never damaged by the abutting members 16 and 16'.

Although not shown in the drawing, the mounting bases 28 and 28' of the pad abutting device 10 may be formed integrally with the magnetic head 12, and otherwise they may be moulded from plastic material on the magnetic head 12.

While some preferred embodiments of the invention have been described and illustrated with reference to the accompanying drawing, it will be understood by those skilled in the art that they are by way of example, and that various changes and modifications may be made without departing from the spirit and scope of the invention, which is intended to be defined only by the appended claims.

What is claimed is:

1. A pad abutting device for a dual capstan type magnetic cassette tape recorder having a magnetic head with a front face which is to be extended through an opening of a cassette mounted thereon, with said cassette giving a pad provided therein, comprising a pair of upper and lower abutting members mounted on the front face of the magnetic head, said abutting members being disposed adjacent opposite edges of the magnetic tape and spaced apart by a distance less than the width of the pad and greater than the width of the magnetic tape in the cassette whereby the pad is prevented from resiliently pressing the magnetic tape against the front face of said magnetic head when said magnetic head is introduced into the cassette, each of said abutting members including a spacer provided integrally therewith and disposed between the body of the corresponding abutting member and the front face of said magnetic head so that said spacer abuts against the front face of said magnetic head, and said spacers of said abutting members having a thickness greater than that of the magnetic tape and being disposed apart by a distance substantially greater than the space between said upper and lower abutting members.

2. A pad abutting device as set forth in claim 1, in which said upper and lower abutting members are formed integrally with common right and left mounting bases which are securely mounted on said magnetic head.

3. A pad abutting device as set forth in claim 2, in which each of said mounting bases comprises a side wall and upper and lower walls provided integrally with said side wall, said upper and lower walls being resiliently engaged with the upper and lower faces of said magnetic head so that said mounting bases are mounted on said magnetic head.

4. A pad abutting device as set forth in claim 2, in which each of said abutting members includes a leg connecting said abutting member with said mounting base.

5. A pad abutting device as set forth in claim 4, in which said leg has a length substantially greater than the thickness of said spacers.

6. A pad abutting device as set forth in claim 4, in which said legs of said abutting members have respective notches which are disposed apart by a distance greater than the space between said upper and lower abutting members.

7. A pad abutting device as set forth in claim 1, in which said spacers of said abutting members are made by deforming metal materials of said abutting members by pressing.

8. A pad abutting device as set forth in claim 1, in which said upper and lower abutting members are formed integrally with upper and lower mounting bases, respectively, which are mounted on said magnetic head at its upper and lower faces.

9. A pad abutting device as set forth in claim 8, in which said spacers of said abutting members are made by deforming metal materials of said abutting members by pressing.

10. A pad abutting device as set forth in claim 8, in which said spacers of said abutting members are made by forming inclined faces at the back faces of said abutting members.

* * * * *

UNITED STATES PATENT AND TRADEMARK OFFICE
CERTIFICATE OF CORRECTION

PATENT NO. : 4,307,427
DATED : December 22, 1981
INVENTOR(S) : Hideo Kawachi

It is certified that error appears in the above—identified patent and that said Letters Patent is hereby corrected as shown below:

Column 5, line 1, "giving" should read -- having --.

Signed and Sealed this

Twenty-fifth Day of May 1982

[SEAL]

Attest:

GERALD J. MOSSINGHOFF

*Attesting Officer*  *Commissioner of Patents and Trademarks*